United States Patent
Cowperthwaite et al.

(10) Patent No.: US 10,191,759 B2
(45) Date of Patent: Jan. 29, 2019

(54) APPARATUS AND METHOD FOR SCHEDULING GRAPHICS PROCESSING UNIT WORKLOADS FROM VIRTUAL MACHINES

(71) Applicant: INTEL CORPORATION, Santa Clara, CA (US)

(72) Inventors: David J. Cowperthwaite, Portland, OR (US); Murali Ramadoss, Folsom, CA (US); Ankur N. Shah, Folsom, CA (US); Balaji Vembu, Folsom, CA (US); Altug Koker, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 15/025,735

(22) PCT Filed: Nov. 27, 2013

(86) PCT No.: PCT/US2013/072169
§ 371 (c)(1),
(2) Date: Mar. 30, 2016

(87) PCT Pub. No.: WO2015/080719
PCT Pub. Date: Jun. 4, 2015

(65) Prior Publication Data
US 2016/0239333 A1   Aug. 18, 2016

(51) Int. Cl.
G06F 9/455 (2018.01)
G06F 9/50 (2006.01)
G06T 1/20 (2006.01)

(52) U.S. Cl.
CPC ........ *G06F 9/45558* (2013.01); *G06F 9/4555* (2013.01); *G06F 9/5044* (2013.01);
(Continued)

(58) Field of Classification Search
CPC . G06F 2009/45579; G06F 2009/45583; G06F 9/45558; G06F 9/461; G06F 9/4881; G06T 1/20; G06T 2200/28
See application file for complete search history.

(56) References Cited

U.S. PATENT DOCUMENTS

| | | | |
|---|---|---|---|
| 8,341,624 B1 * | 12/2012 | Hobbs | H04N 19/152 709/204 |
| 2007/0008324 A1 * | 1/2007 | Green | G06T 1/00 345/501 |

(Continued)

FOREIGN PATENT DOCUMENTS

| | | |
|---|---|---|
| CN | 102089752 | 6/2011 |
| CN | 103034524 | 4/2013 |
| CN | 103282881 | 9/2013 |

OTHER PUBLICATIONS

International Searching Authority, "Notification of Transmittal of the International Search Report and the Written Opinion of the International Searching Authority," dated Aug. 29, 2014, in International application No. PCT/US2013/072169.

(Continued)

*Primary Examiner* — Eric C Wai
*Assistant Examiner* — Jorge A Chu Joy-Davila
(74) *Attorney, Agent, or Firm* — Trop, Pruner & Hu, P.C.

(57) ABSTRACT

In an embodiment, a system includes a graphics processing unit (GPU) that includes one or more GPU engines, and a microcontroller. The microcontroller is to assign a respective schedule slot for each of a plurality of virtual machines (VMs). When a particular VM is scheduled to access a first GPU engine, the particular VM has exclusive access to the first GPU engine. Other embodiments are described and claimed.

16 Claims, 6 Drawing Sheets

(52) U.S. Cl.
CPC .............. *G06F 9/5077* (2013.01); *G06T 1/20* (2013.01); *G06F 2009/4557* (2013.01); *G06F 2009/45579* (2013.01); *G06F 2009/45583* (2013.01); *G06T 2200/28* (2013.01)

(56) References Cited

U.S. PATENT DOCUMENTS

| | | | | |
|---|---|---|---|---|
| 2007/0139423 | A1* | 6/2007 | Kong | G09G 5/363 345/502 |
| 2007/0294693 | A1 | 12/2007 | Barham | |
| 2009/0006782 | A1 | 1/2009 | Buchmann et al. | |
| 2010/0262722 | A1 | 10/2010 | Vauthier et al. | |
| 2011/0067016 | A1* | 3/2011 | Mizrachi | G06F 8/4442 717/149 |
| 2011/0102443 | A1* | 5/2011 | Dror | G06T 1/20 345/522 |
| 2012/0084774 | A1* | 4/2012 | Post | G06F 9/5088 718/1 |
| 2012/0167082 | A1* | 6/2012 | Kumar | G06F 9/4555 718/1 |
| 2013/0057563 | A1 | 3/2013 | Persson | |
| 2013/0091500 | A1 | 4/2013 | Earl et al. | |
| 2013/0174144 | A1 | 7/2013 | Cheng et al. | |
| 2013/0187932 | A1* | 7/2013 | Malakapalli | G06T 1/20 345/501 |
| 2014/0373005 | A1* | 12/2014 | Agrawal | G06F 9/45558 718/1 |

OTHER PUBLICATIONS

Dowty, et al: "GPU virtualization on VMware's hosted I/O architecture", Operating Systems Review, ACM, New York, NY, US, vol. 43, No. 3, Jul. 31, 2009, pp. 73-82.

Ravi, et al: "Supporting GPU sharing in cloud environments with a transparent runtime consolidation framework", 20th ACM International Symposium On High-Performance Parallel And Distributed Computing, HPDC' 11, Jun. 11, 2011, pp. 217-228.

European Patent Office, Extended European Search Report dated Nov. 29, 2017 in European Patent Application No. 13898093.3.

State Intellectual Property Office of The People's Republic of China, First Office Action dated Aug. 31, 2018, in Chinese Patent Application No. 201380080556.X.

European Patent Office, Communication pursuant to Article 94(3) EPC dated Oct. 29, 2018 in European Patent Application No. 13898093.3.

\* cited by examiner

APPARATUS AND METHOD FOR SCHEDULING GRAPHICS PROCESSING UNIT WORKLOADS FROM VIRTUAL MACHINES

TECHNICAL FIELD

Embodiments pertain to scheduling graphical processor unit workloads from virtual machines.

BACKGROUND

Virtualization of client operating systems is a trend in modern computing systems. A virtualized computing platform may have a plurality of virtual machines (VMs), and during a particular time period a single corresponding VM may appear to have complete use of computational hardware.

Virtualization can be utilized in conjunction with graphics-intensive applications and workloads, which may increase requirements for graphical processing unit (GPU) virtualization technologies. Access to full capability of a GPU can be realized by "pass-through" of the GPU by a virtual machine manager (VMM) to a single VM. While pass-through performance is good, it is fundamentally limited to a one-to-one mapping of a particular GPU to a particular VM.

DETAILED DESCRIPTION

Figure 1:
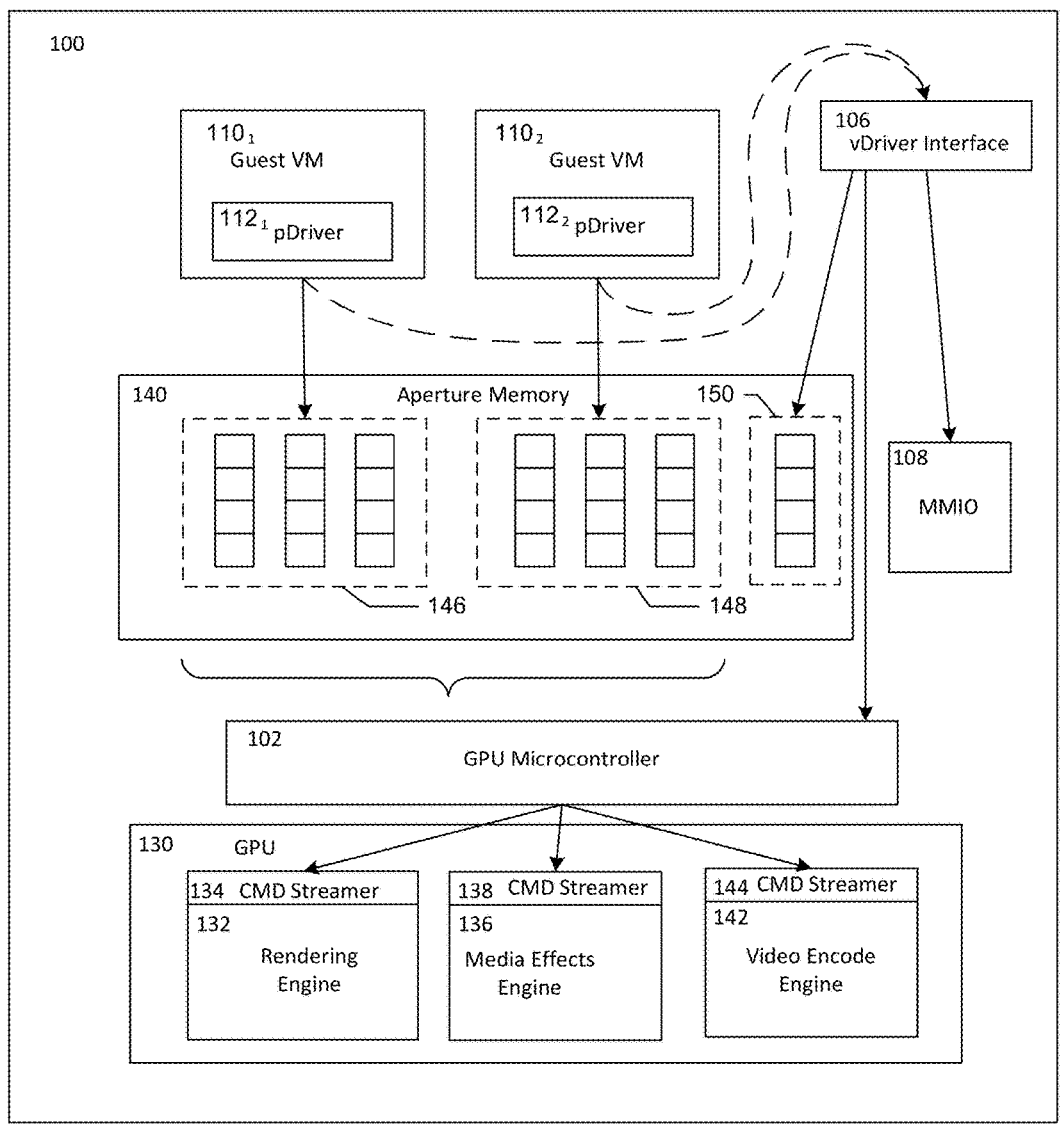
FIG. 1 is a system to enable scheduled access to a GPU by a plurality of VMs, according to embodiments of the present invention.

Capabilities of a GPU (e.g., graphics application program interfaces (APIs), Media APIs, and compute APIs) may be realized through shared access to a single GPU by multiple virtual machines.

A traditional model for GPU workload handling relies on a single graphics and media software stack and a point of submission to prioritize and schedule on the GPU. Shared access to the GPU is typically done via a software (SW) manager, e.g., a virtual machine manager (VMM) with software capabilities that may provide, e.g., acceleration of specific three dimensional APIs to the VMs. The VMM SW may manage aggregation of API calls and workloads from multiple guest VMs into one central domain (e.g., host operating system or service domain) via which a physical GPU and an associated SW driver is available. However, a software manager may introduce challenges and complexity in a translation of workloads from the APIs employed by the VM, to the APIs available to a VMM SW stack in a host operating system (OS) or service domain.

To reduce latencies associated with the traditional model for GPU workload scheduling, and to provide for flexible access to the GPU for non-graphics applications (e.g., compute applications), an embedded microcontroller ("microcontroller," "graphics microcontroller" or "GPU microcontroller") may be employed that is capable of servicing multiple application or operating system level work queues concurrently (e.g., in parallel). In some embodiments, the GPU microcontroller may be located within the GPU (e.g., embedded microcontroller). In some embodiments, the GPU microcontroller may be coupled with, or included within, the GPU. In some embodiments the microcontroller may be a hardware microcontroller. Additional computing efficiency and access to an enhanced variety of GPU capabilities may result from use, by each VM, of a corresponding device driver to interface with the GPU.

The graphics microcontroller may schedule workloads to be executed concurrently within, and across, multiple VMs (e.g, in parallel). Additionally, the graphics microcontroller may maintain a corresponding GPU state unique to each VM, e.g., a set of GPU configuration parameters associated with the VM. Upon a scheduled transition of GPU workload execution from a first VM to a second VM, the graphics microcontroller may save the GPU state unique to the first VM from the GPU and provide (or restore) the corresponding GPU state of the second VM to the GPU. In an embodiment, the graphics microcontroller may save each configuration of the GPU in a memory-based storage, e.g. one or more sets of virtual or physical registers, and may provide or restore to the GPU a particular GPU state of a particular VM, the particular GPU state corresponding to a driver interface (vdriver) that has facilitated transmission of one or more GPU workloads from the particular VM. Each VM's GPU state may be saved/restored from the memory that is accessible to the GPU. In an embodiment, memory (e.g. aperture memory) that is accessible to the GPU and to a processor, may be used for GPU state storage and for passing of workloads to the GPU. Stored workloads may include commands and data, and GPU stored states may include one or more earlier saved states from VM applications, operating system, or driver running on the processor. VMM SW may configure an availability of each VM's GPU state (e.g., stored in processor memory or in GPU memory), and may make available to the microcontroller a particular GPU state associated with a particular VM. The GPU state of the particular VM ("per-VM GPU state") may be used by the graphics microcontroller to reconfigure the GPU in preparation for execution of a workload provided by the particular VM that will subsequently have temporary but exclusive access to the GPU (or portion thereof) for a scheduled interval of time.

Referring to FIG. 1, shown is a system 100 to enable scheduled access to a GPU by a plurality of VMs, according to embodiments of the present invention. The system 100 includes a GPU microcontroller 102, an aperture memory 140, a vdriver interface 106, a memory mapped input/output (MMIO) 108 mechanism to interact with a workload queue controller (not shown) of a GPU 130, and a plurality of guest VMs $110_1$, $110_2$ (, . . . $110_n$), each of which has a corresponding paravirtualized GPU driver (pdriver) $112_1$, $112_2$(, . . . $112_n$). In some embodiments the workload queue controller may be hardware within the GPU 130. The GPU microcontroller 102 is coupled to a GPU 130 (or a component thereof) that may include distinct sub-components such as, but not limited to, a rendering engine 132 fed by commands from command streamer 134, a media effects engine 136 fed by command streamer 138, and a video encode engine 142 fed by command streamer 144. In other embodiments the GPU 130 may have more engines or less engines, each of which may be designed to handle one or more specific types of tasks/workloads.

In operation, the GPU microcontroller 102 may schedule workloads of each of the guest VMs $110_1, 110_2, \ldots, 110_n$ to be executed by the GPU 130. Each VM $110_1, 110_2, \ldots, 110_n$ may be scheduled, in corresponding schedule slots, to exclusively access the GPU 102 or a portion thereof, e.g., rendering engine 132, media effects engine 134, video encode engine 142, or other engine or portion of the GPU 130, according to a schedule implemented by the GPU microcontroller 102. For example, the VM $110_1$ may be scheduled, in a first schedule slot, to exclusively access the GPU 102 and to execute a first workload, e.g., a first set of instructions supplied by the VM $110_1$, to be executed by the GPU 130. Prior to execution of the first workload by the GPU 102, the GPU microcontroller 102 may retrieve a first GPU state, e.g., a first set of parameter values specific to VM $110_1$ with which to configure the GPU 130. Thus, the GPU 130 may be configured prior to execution of the first workload issued from the VM $110_1$. The first GPU state may be previously stored, by the vdriver interface 106, in, e.g., the aperture memory 140 (e.g., within memory portion 150 or within other memory accessible to the GPU microcontroller 102). Each of the VMs $110_1$-$110_n$ may have a corresponding set of parameter values (GPU state) stored (e.g., in the memory portion 150) by the vdriver interface 106. When a particular $VM_i$ is scheduled to access the GPU 130 (or portion thereof), the GPU state of the $VM_i$ may be recalled by the GPU microcontroller 102 in coordination with the vdriver interface 106 to provide or restore a corresponding configuration of the GPU 130 (or portion thereof) prior to execution of a task by the GPU 130 or portion thereof.

Each $VM_i$ (i=1 to n) may be assigned a corresponding portion of the memory 140, e.g., memory portion 146, 148, or another memory portion (not shown), by the vdriver interface 106, and a configuration of memory portion assignments may be indicated to the GPU microcontroller 102 by the vdriver interface 106. When a particular VM, e.g., VM $110_1$, is scheduled to exclusively access the GPU 130, memory access by the GPU 130 may be restricted to the corresponding portion or portions of the memory 140 (e.g., memory portion 146) during execution of the tasks to be executed on the GPU 130 (or portion thereof) that are provided by the VM $110_1$ via commands passed to the GPU 130, e.g., through the aperture memory 140, or via other mechanism.

Accesses to system memory may be translated by a DMA translation engine (not shown) that facilitates a translation of VM addresses, employed in programming of the GPU 130, to system addresses used by the GPU 130. The translation(s) for a particular VM may be governed by use of a specific PCI device function number associated with a particular virtual interface, physical interface, or VM. The PCI device function number ("function number") may be included in the GPU workload and may be associated with a point of submission of a given workload or may be independently determined by mutual coordination of the vdriver interface 106 and the GPU microcontroller 102. The function number associated with a particular VM (or workload issued by the particular VM) may be included in configuration information to be loaded into the GPU 130 prior to execution of the workload issued by the particular VM. Use of the device function number to control access to memory pages that are exclusively associated with a particular VM, through the vdriver interface 106 and VMM (not shown), may increase efficiency in execution of the workload over other techniques such as access to all portions of the aperture memory 140 by each VM and the GPU 130, and SW translation of VM-to-system memory addresses (e.g., guest-to-host address translation).

The GPU microcontroller 102 may distribute portions of a task to different parts of the GPU 130. For example, command streamer 134 may provide one or more sets of instructions/operations to be executed by a rendering engine 132 of the GPU 130. The command streamer 138 may also provide one or more instructions/operations to be executed by a media effects engine 136 of the GPU 130. The command streamer 144 may provide one or more instructions/ operations to be executed by a video encode engine 142 of the GPU 130.

In some embodiments a particular VM, e.g., VM $110_1$ may have exclusive use of the entirety of the GPU during a scheduled slot. In other embodiments, during a particular schedule slot, a first VM may have exclusive use of only a first portion (e.g., engine) of a plurality of portions of the GPU, e.g., exclusive access only to the rendering engine 132 of GPU 130. In an embodiment, the configuration state associated with the scheduled VM, including the device function number of the scheduled first VM, may be provided to the first portion of the GPU in order for the first portion of the GPU to execute a work load of the first VM during the scheduled slot of the first VM. A second VM may be scheduled exclusive access to a second GPU portion of the GPU (e.g., media effects engine 136 of GPU 130) during a same time period as the first VM access to the first GPU portion. That is, each of the first VM and the second VM may be permitted exclusive access to a respective GPU portion and corresponding workloads from the VMs may be executed in parallel (e.g., concurrently) by the respective GPU portions. Each GPU portion may be provided with the corresponding configuration state and device function number associated with the VM that is to access the respective GPU portion, prior to execution of the work load to be provided by the corresponding VM to the respective GPU portion.

Figure 2:
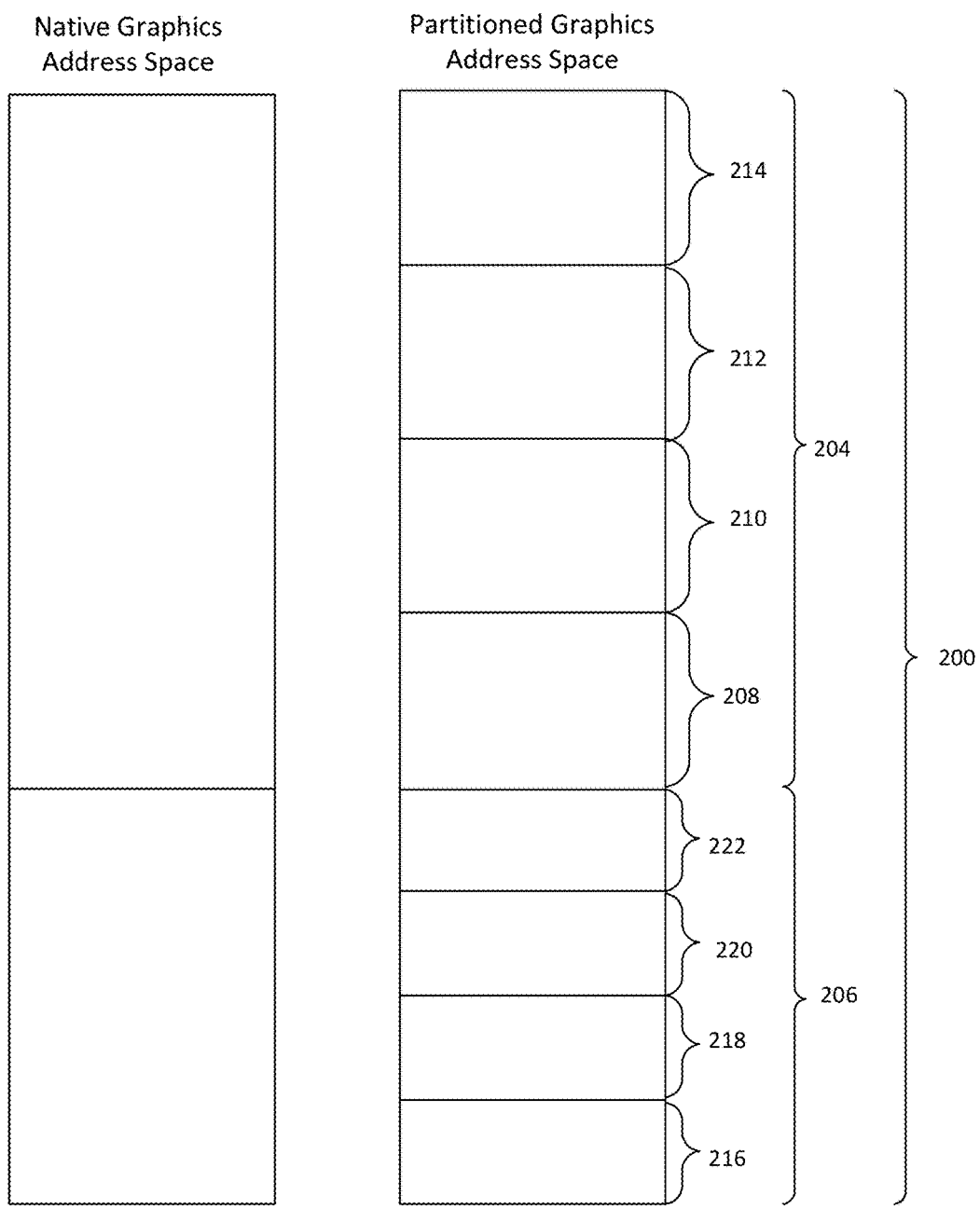
FIG. 2 is a block diagram of a graphics memory prior to partitioning and with partitioning in place, according to embodiments of the present invention.

Referring to FIG. 2, shown is a block diagram of a graphics memory 200, prior to partitioning ("native graphics address space") and with partitioning in place. The (partitioned) graphics memory 200 may include a graphics aperture space 204, e.g., memory space that may be shared between the GPU and a processor (e.g., central processing unit), and the graphics memory 200 may also include a general purpose global graphics address space 206. Each of a plurality of VMs may be allotted a corresponding portion of the graphics aperture space 204 and a corresponding portion of general purpose global graphics address space 206. For example, a $VM_1$ may be assigned a portion 208 of the graphics aperture space 204 and a portion 216 of the general purpose global graphics address space 206. A $VM_2$ may be assigned a portion 210 of the graphics aperture space 204 and a portion 218 of the general purpose global graphics address space 206. A $VM_3$ may be assigned a portion 212 of the graphics aperture space 204 and a portion 220 of the general purpose global graphics address space 206. A $VM_4$ may be assigned a portion 214 of the graphics aperture space 204 and a portion 222 of the general purpose global graphics address space 206.

VMM software (not shown), e.g., a VMM hypervisor, may determine available function numbers to identify a corresponding portion of memory. A device function number may be associated with each VM by a vdriver interface that manages association of the device function number with the corresponding VM. Accesses by the GPU (or portion thereof) to system memory pages mapped into the (shared) graphics memory 200 may be translated and governed by an IO memory mapping unit ("IOMMU," not shown) using the device function number associated with the VM that currently has exclusive access to the GPU (or portion thereof). In an embodiment, each workload will be restricted to access only the portion of the graphics memory that is associated with the corresponding function number and associated with the corresponding virtual machine that issues the workload.

Figure 3:
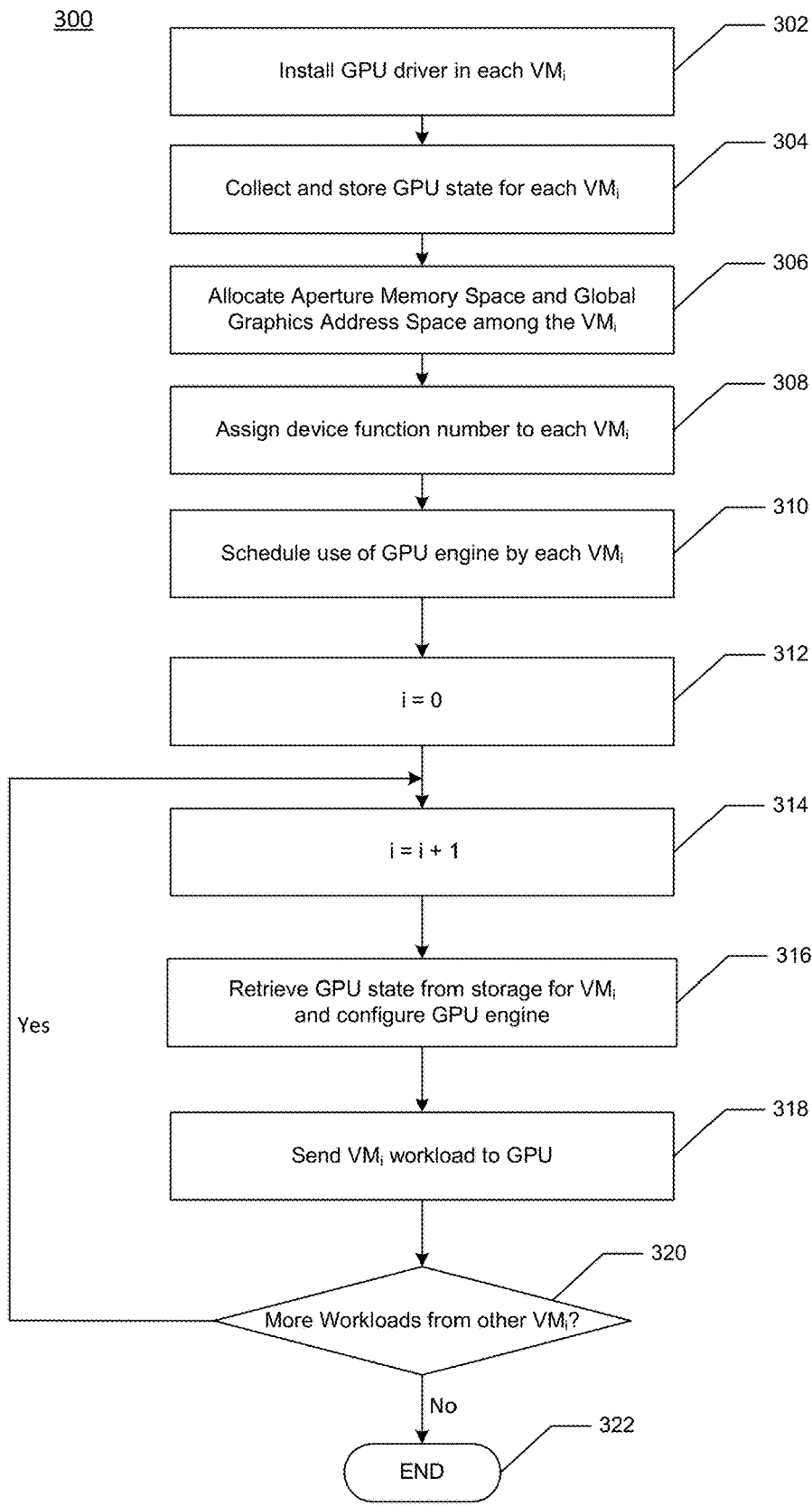
FIG. 3 is a flowchart of a method of executing workloads that originate on various virtual machines, to be executed on a GPU.

Referring to FIG. 3, shown is a flowchart of a method 300 of executing workloads that originate on a plurality of virtual machines, to be executed on a GPU. At block 302, a GPU driver is installed in each VM. Continuing to block 304, for each VM, a corresponding GPU state (e.g., one or more configuration parameters) is stored to a system memory by, e.g., a vdriver interface that has received the corresponding GPU state from the corresponding driver within the VM. Advancing to block 306, graphics aperture memory space and global graphics address space are allocated to each VM. Moving to block 308, a device function number is assigned (e.g., by a VMM hypervisor) to each $VM_i$. The device function number of a particular VM may be used by a GPU microcontroller to allow the GPU (or one of its discrete engines) to access a corresponding memory space during execution of a workload provided by the particular VM. Proceeding to block 310, use of the GPU (or GPU engine or other portion thereof) by each $VM_i$ is scheduled by the GPU microcontroller. For example, in one embodiment, each $VM_i$ may be scheduled serially for exclusive access to the GPU. In other embodiments, two or more VMs may be scheduled to exclusively access corresponding portions of the GPU in parallel (e.g., concurrently), so that a first workload provided by a first VM is executed by a first GPU portion of the GPU, while a second workload provided by a second VM is executed by a second GPU portion of the GPU.

At block 312, an index i is set equal to zero. Proceeding to block 314, the index is incremented. At block 316, the GPU state is retrieved for a $VM_i$ that is to have exclusive access to the GPU or to a discrete portion of the GPU (e.g., rendering engine 132 of FIG. 1), and the GPU or GPU portion is configured according to the retrieved GPU state. Moving to block 318, the workload provided by the $VM_i$ is sent to the GPU or GPU portion to be executed. Advancing to decision diamond 320 it is determined whether there are additional workloads to be executed on the GPU that originate in other VMs. If so, returning to block 314, the index i is incremented and the method proceeds to block 316. In some embodiments, workloads from several VMs may be executed concurrently, e.g., execution on different GPU portions in parallel. In other embodiments, one VM may have exclusive use of the GPU during a given time period, e.g., schedule slot. If there are no more workloads to be executed by the GPU from other VMs, the method ends at 322.

Figure 4:
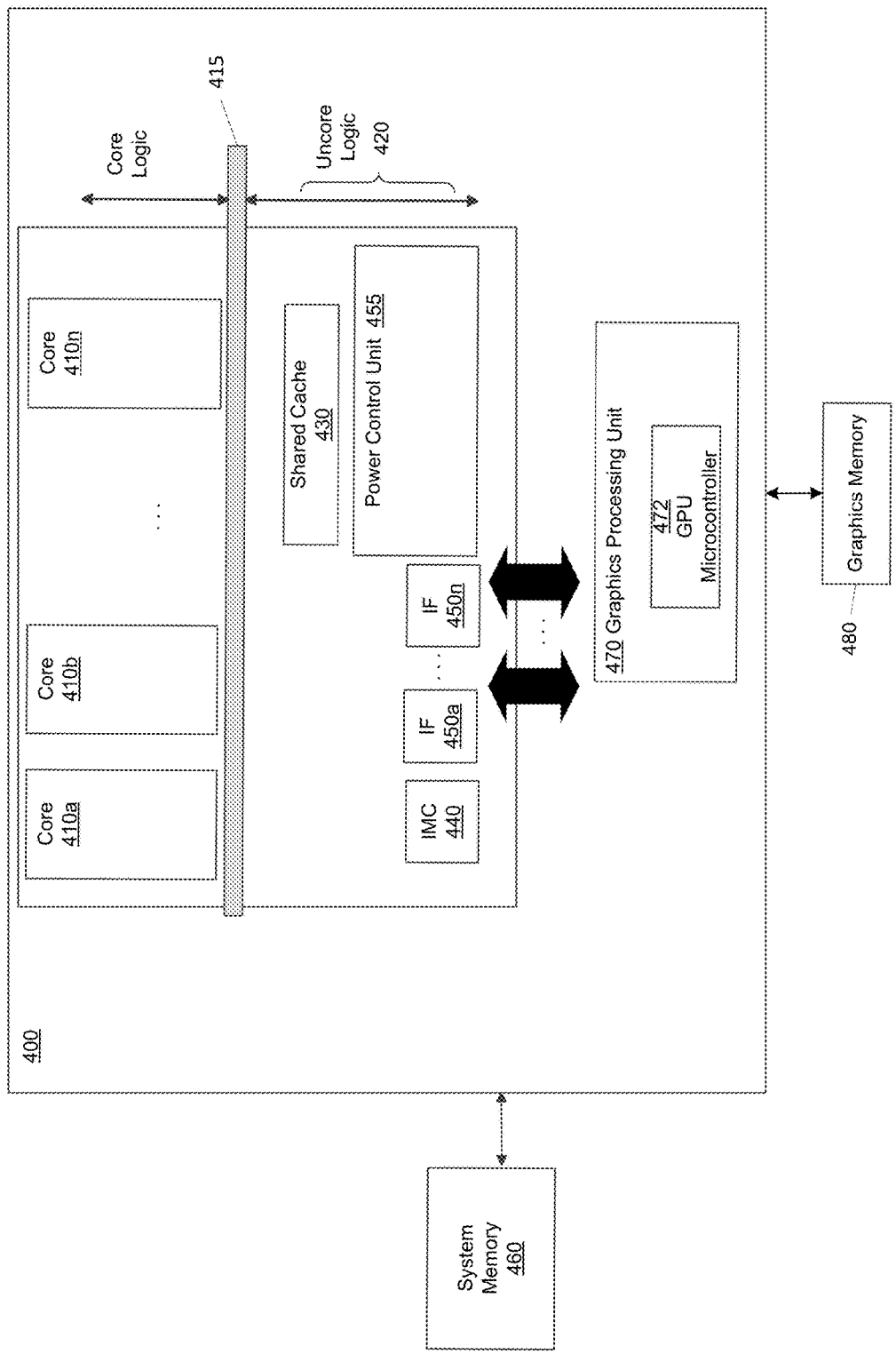
FIG. 4 shows a block diagram of a processor, in accordance with an embodiment of the present invention.

Referring now to FIG. 4, shown is a block diagram of a processor, in accordance with an embodiment of the present invention. As shown in FIG. 4, processor 400 may be a multicore processor including a plurality of cores $410_a$-$410_n$. The various cores may be coupled via an interconnect 415 to a system agent or uncore 420 that may include various components. As seen, the uncore 420 may include a shared cache 430, which may be a last level cache. In addition, the uncore 420 may include an integrated memory controller 440, various interfaces 450, and a power control unit (PCU) 455.

With further reference to FIG. 4, processor 400 may communicate with a system memory 460, e.g., via a memory bus. In addition, by interfaces 450, connection can be made to various off-chip components such as peripheral devices, mass storage and so forth.

The processor 400 may include a graphics processing unit (GPU) 470, which may be coupled to a graphics memory 480. The GPU 470 may include a GPU microcontroller 472 that is configured to schedule access to the GPU 470 (or portion thereof) by each of a plurality of VMs, according to embodiments of the present invention. Each VM, during its scheduled execution slot, may have exclusive access to the GPU 470 or portion thereof, according to embodiments of the present invention. In some embodiments, several VMs may uniquely access corresponding portions of the GPU and may execute corresponding workloads concurrently on their respective portions of the GPU. In some embodiments of the present invention, each VM is assigned a unique memory portion of the graphics memory 480 and when a particular VM is scheduled by the GPU microcontroller 472 to access the GPU 470, the memory portion accessible to the GPU 470 is restricted to the memory portion associated with the particular VM. In some embodiments, the GPU microcontroller 472 is configured to save, for each of the plurality of VMs, a respective GPU configuration in a corresponding register set (not shown), so that when a particular VM is scheduled to access the GPU 470 (or portion thereof), the GPU microcontroller 472 is to provide or restore within the GPU 470 (or portion thereof) the corresponding GPU configuration, e.g., by retrieval of the respective GPU configuration from the corresponding register set. While shown with this particular implementation in the embodiment of FIG. 4, the scope of the present invention is not limited in this regard.

Figure 5:
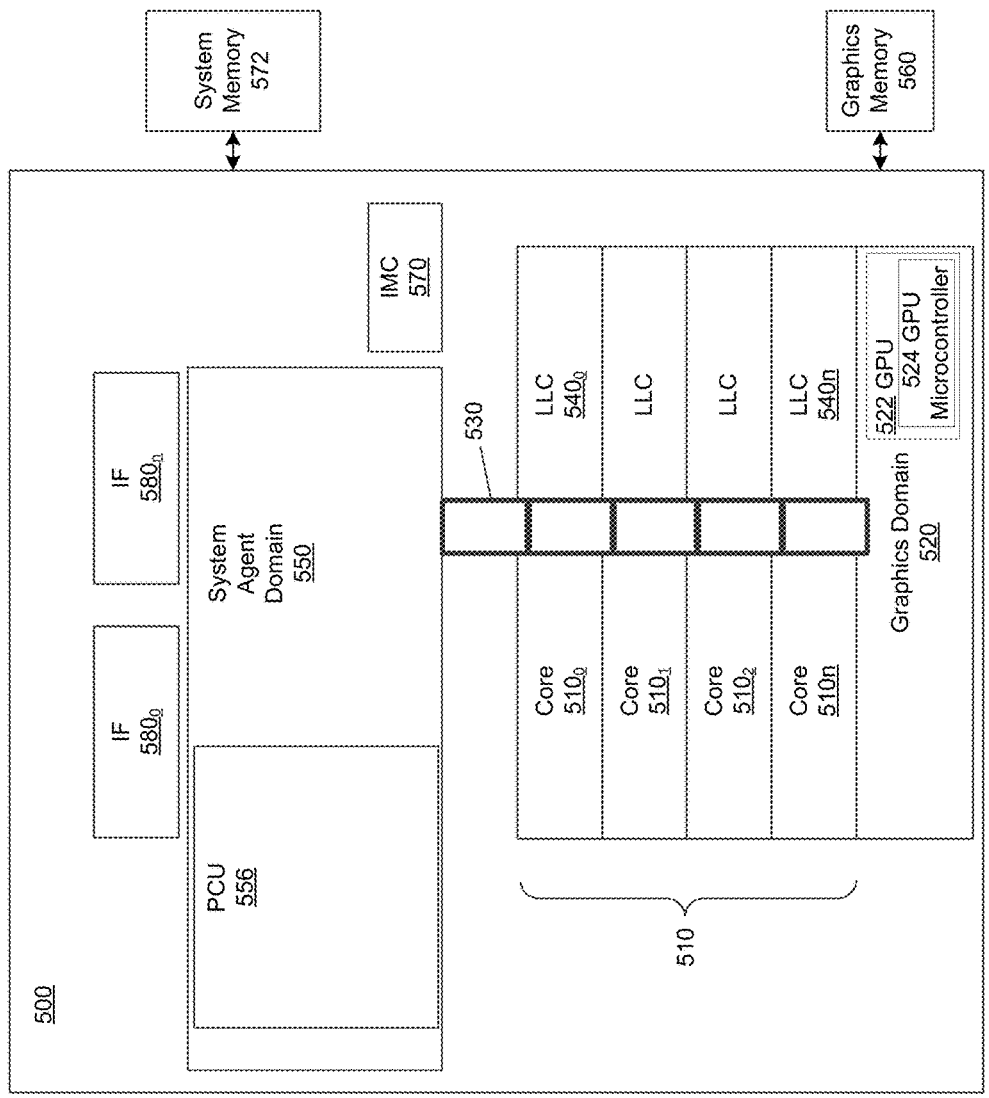
FIG. 5 is a block diagram of a multi-domain processor in accordance with an embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, and a graphics domain 520 can include one or more graphics engines (e.g., GPU 522). And processor 500 includes a system agent domain 550. Note that additional domains can be present in other embodiments. For example, multiple core domains may be present each including at least one core.

In general, each core $510_i$ may further include low level caches in addition to various execution units and additional processing elements. The various cores may be coupled to each other and to a shared cache memory formed of a plurality of units of a lower level cache (LLC) $540_0$-$540_n$. In various embodiments, LLC $540_0$-$540_n$ may be shared amongst the cores and the graphics engine, as well as various media processing circuitry. As seen, a ring interconnect 530 couples the cores together, and provides interconnection between the cores 510, graphics domain 520, and the circuitry for system agent domain 550.

The graphics domain 520 may be coupled with a graphics memory 560 that is external to the processor 500. The GPU 522 may include a GPU microcontroller 524 that is configured to schedule access to the GPU 522 (or portion thereof) by each of a plurality of VMs, according to embodiments of the present invention. Each VM, during its scheduled slot, may have exclusive access to the GPU 522 (or portion thereof), according to embodiments of the present invention. In some embodiments of the present invention, each VM is assigned a unique memory portion of the graphics memory 560, and when a particular VM is scheduled by the GPU microcontroller 524 to access the GPU 522, access to the graphics memory 560 by the GPU 522 may be restricted to the memory portion associated with the particular VM. In some embodiments, access by the GPU 522 to the graphics memory 560 is restricted to the memory portion assigned to the VM that has exclusive access to the GPU 522 (e.g., during the scheduled slot of the VM). The GPU microcontroller 524 may be configured to save, for each of the plurality of VMs, a respective GPU configuration in a corresponding physical or virtual register set (not shown), so that when a particular VM is scheduled to access the GPU 522 (or portion thereof), the GPU microcontroller 524 may provide or restore within the GPU 522 (or portion thereof) the corresponding GPU configuration by, e.g., retrieval of the respective GPU configuration from the corresponding register set, in accordance with embodiments of the present invention.

As further seen, system agent domain 550 may include a power control unit (PCU) 556 to perform power management operations for the processor. Processor 500 can further include an integrated memory controller (IMC) 570 that can provide for an interface to a system memory 572, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 5, understand the scope of the present invention is not limited in this regard.

Figure 6:
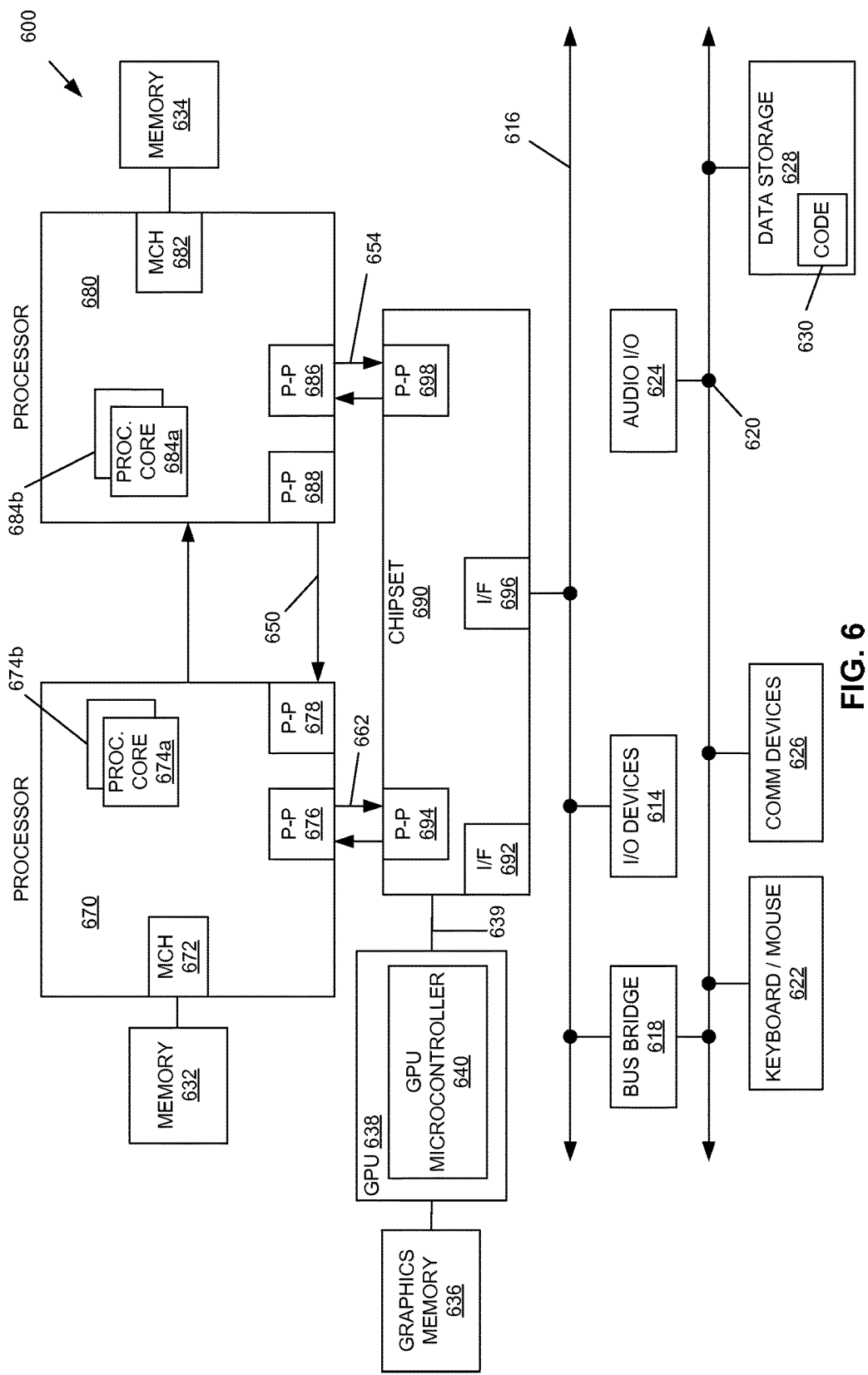
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (e.g., processor cores 674a and 674b, and processor cores 684a and 684b), although potentially many more cores may be present in the processors.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to respective processors. First processor 670 and second processor 680 may be coupled to a chipset 690 via P-P interconnects 662 and 654, respectively. As shown in FIG. 6, chipset 690 includes P-P interfaces 694 and 698.

Furthermore, chipset 690 includes an interface 692 to couple chipset 690 with a graphics processing unit (GPU) 638 by a P-P interconnect 639. The graphics engine 638 may be coupled to a graphics memory 636.

The GPU 638 may include a GPU microcontroller 640 that may be configured to schedule access to the GPU 638 (or portion thereof) by each of a plurality of VMs, according to embodiments of the present invention. Each VM, during its scheduled slot, may have exclusive access to the GPU 638 (or portion thereof), according to embodiments of the present invention. In some embodiments of the present invention, each VM is assigned a unique memory portion of the graphics memory 636. When a particular VM is scheduled by the GPU microcontroller 640 to access the GPU 638 (or portion thereof), access to the graphics memory 636 by the GPU 638 (or portion thereof) may be restricted to the memory portion associated with the VM.

In some embodiments, the GPU microcontroller 640 is configured to save, for each of the plurality of VMs, a respective GPU configuration in a corresponding storage (not shown), so that when a particular VM is scheduled to access the GPU 638 (or portion thereof) the GPU microcontroller 640 is to provide or restore within the GPU 638 (or portion thereof) the corresponding GPU configuration, e.g., by retrieval of the respective GPU configuration from the corresponding storage.

Chipset 690 may be coupled to a first bus 616 via an interface 696. As shown in FIG. 6, various input/output (I/O) devices 614 may be coupled to first bus 616, along with a bus bridge 618, which couples first bus 616 to a second bus 620. Various devices may be coupled to the second bus 620 including, for example, a keyboard/mouse 622, communication devices 626 and a data storage unit 628 such as a disk drive or other mass storage device that may store code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Additional embodiments are described below.

In a first example, a system includes a graphics processing unit (GPU) that includes one or more GPU engines. The system also includes a microcontroller to assign a respective execution schedule slot for each of a plurality of virtual machines (VMs) to access a corresponding GPU engine, where when a particular VM is scheduled to access a first GPU engine of the GPU, the particular VM has exclusive access to the first GPU engine.

A second example includes the features of the first example. Optionally, each VM includes a respective device driver interface that enables the respective VM to execute a corresponding workload on the corresponding GPU engine. The system may further include a virtualization driver interface (vdriver interface) to facilitate providing to the microcontroller, for each respective VM, a respective GPU configuration to be stored. Each GPU configuration is to include one or more configuration parameters associated with the respective VM.

A third example includes all features of the first and second examples, and further when a first VM is scheduled to access the first GPU engine, the microcontroller is to provide to the first GPU engine a first GPU configuration associated with the first VM by retrieval of the first GPU configuration from a first storage. When a second VM is scheduled to access the first GPU engine, the microcontroller is to provide to the first GPU engine a second GPU configuration associated with the second VM by retrieval of the second GPU configuration from a second storage. Optionally, the vdriver interface, upon being instantiated by a virtual machine manager (VMM), is to allocate a corresponding memory space to each VM. Optionally, when a particular VM is to access the first GPU engine, memory access by the first GPU engine is restricted to the corresponding memory space allocated to the particular VM.

A fifth example includes the features of examples 1 through 4, and where each VM is associated with a unique device function number. A memory access instruction provided by the first VM to the first GPU engine may be executed through use of the corresponding device function number.

A sixth example includes the features of example 1, and the GPU further includes a second GPU engine, and the microcontroller is configured to schedule execution a first work load, issued by the first VM, on the first GPU engine, and the microcontroller is configured to schedule execution of a second work load, issued by a second VM, on the second GPU engine. The first work load and the second workload are to be executed concurrently.

In a seventh example, a method includes assigning a unique memory space to each of a plurality of virtual machines (VMs) including assigning a first memory space to a first VM and assigning a second memory space to a second VM. The method also includes executing, on a first graphical processing unit (GPU) engine of a GPU, first instructions issued by the first VM and executing, on a second GPU engine of the GPU, second instructions issued by a second VM. Responsive to a first memory access issued by the first VM, memory access by the first GPU engine is restricted to the first memory space, and responsive to a second memory access issued by the second VM, memory access by the second GPU engine is restricted to the second memory space. Optionally, the method includes storing in a first storage a first state that includes a first set of parameter values associated with a first VM, and storing a second state that includes a second set of parameter values associated with a second VM in a second storage, and responsive to access enablement of the first VM to the first GPU engine, retrieving the first state from the first storage and configuring the first GPU engine according to the first state. The method also includes responsive to access enablement of the second VM to the second GPU engine, retrieving the second state from the second storage and configuring the second GPU engine according to the second state.

An eighth example includes the features of the seventh example, and also includes scheduling exclusive access to a respective GPU engine by each of a plurality of VMs during a respective access slot. The scheduling is to be determined by a graphics microcontroller coupled to the GPU.

A ninth example includes the features of the eighth example. Additionally, the first instructions issued by the first VM are executed by the first GPU engine concurrently with execution by the second GPU engine of the second instructions issued by the second VM.

In a $10^{th}$ example, at least one machine readable storage includes machine-readable instructions when executed, to implement a method as in any of examples 7-9.

An $11^{th}$ example is an apparatus including means to perform a method as in any of examples 7-9.

A $12^{th}$ example is an apparatus that includes data storage to store a first set of parameter values associated with a first virtual machine (VM) and a second set of parameter values associated with a second VM. The apparatus also includes a microcontroller to configure a first graphics processing unit (GPU) engine of a GPU according to the first set of parameter values responsive to the first VM being scheduled for access to the first GPU engine, and the microcontroller is to configure a second GPU engine according to the second set of parameter values responsive to the second VM scheduled for access to the second GPU engine.

A $13^{th}$ example includes the features of example 12, and the microcontroller is to restrict access by the first GPU engine to a first portion of a memory that is uniquely associated with the first VM responsive to the first VM having exclusive access to the first GPU engine. Additionally the microcontroller is to restrict access by the second GPU engine to a second portion of the memory that is uniquely associated with the second VM responsive to the second VM having exclusive access to the second GPU engine.

Example 14 includes the features of example 13. Additionally, the microcontroller is to enable exclusive access by the first VM to the first GPU engine during a first schedule slot of a schedule. The microcontroller is to enable exclusive access by the second VM to the second GPU engine during a second schedule slot of the schedule.

Example 15 includes the features of example 14. Additionally, the exclusive access by the first VM to the first GPU engine occurs while the second VM has exclusive access to the second GPU engine.

Example 16 includes the features of example 15 and the exclusive access of a particular VM to a particular GPU engine of the GPU enables execution of a workload issued by the particular VM exclusively on the particular GPU engine.

Example 17 includes the features of example 12, and further includes a plurality of VMs including the first VM and the second VM. Each VM includes a respective device driver to enable a corresponding GPU engine to execute a respective workload to be provided by the respective VM, and each device driver is to interface with the GPU independent of any other device driver.

Example 17 includes the features of example 16. Further, each of the plurality of VMs has an independent operating system stack.

Example 18 includes the features of example 16. Example 18 further includes a virtual device interface coupled to each of the VMs. The virtual device interface is to receive the first set of parameter values from a first device driver of the first VM and receive the second set of parameter values from a second device driver of the second VM, and to store the first set of parameter values and the second set of parameter values in the data storage. The virtual device interface is to retrieve from the data storage and provide the first set of parameter values to the microcontroller responsive the first VM being scheduled exclusive access to the first GPU engine, and to retrieve from the data storage and provide the second set of parameter values to the microcontroller responsive to the second VM being scheduled exclusive access to the second GPU engine.

Example 19 includes features of any one of examples 12-18. Further, the microcontroller is to schedule a respective workload to be executed on the GPU by each of a plurality of VMs including the first VM and the second VM.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
   a graphics processing unit (GPU) comprising multiple GPU engines;
   a microcontroller in the GPU; and
   a storage medium having stored thereon instructions which, when executed, implement a virtual machine manager (VMM) to instantiate a virtualization driver interface (vdriver interface) that is adapted to
   (a) communicate with the GPU via the microcontroller,
   (b) enable multiple virtual machines (VMs) to communicate with the GPU,
   (c) store, to memory that is accessible to the microcontroller, a first GPU state for a first VM among the multiple VMs, and
   (d) store, to the memory that is accessible to the microcontroller, a second GPU state for a second VM among the multiple VMs;
   wherein each VM, when instantiated, is associated with a unique Peripheral Component Interconnect (PCI) device function number and comprises a paravirtualized GPU driver (pdriver) to enable that VM to communicate with the GPU via the vdriver interface, at least in part by enabling that VM to send GPU state for that VM to the vdriver interface of the VMM, for subsequent utilization by the microcontroller in the GPU;
   wherein the microcontroller is adapted to
   (a) obtain the first GPU state for the first VM, after the vdriver interface of the VMM has received the first GPU state from the pdriver of the first VM and stored the first GPU state to the memory,
   (b) obtain the second GPU state for the second VM, after the vdriver interface of the VMM has received the second GPU state from the pdriver of the second VM and stored the second GPU state to the memory,
   (c) assign a first schedule slot for the first VM to access a first GPU engine among the multiple GPU engines,
   (d) assign a second schedule slot for the second VM to access a second GPU engine among the multiple GPU engines, and
   (e) in preparation for transitioning execution from the first VM to a third VM among the multiple VMs, saving the first GPU state for the first VM and restoring a third GPU state for the third VM;
   wherein the GPU is adapted to grant exclusive access to the first GPU engine for the first VM when the first VM accesses the first GPU engine; and
   wherein, when the first GPU engine executes a memory access instruction provided by the first VM, the first GPU engine is adapted to use the PCI device function number associated with the first VM to execute the memory access instruction.

2. The system of claim 1, wherein the pdriver for the first VM enables the first VM to execute a workload on the first GPU engine.

3. The system of claim 2, wherein the first GPU state comprises a first GPU configuration for the first VM, and wherein the first GPU configuration for the first VM comprises one or more configuration parameters associated with the first VM.

4. The system of claim 3, wherein, when the first VM is scheduled to access the first GPU engine, the microcontroller is to provide to the first GPU engine the first GPU configuration for the first VM by retrieving the first GPU configuration from the memory.

5. The system of claim 3, wherein the vdriver interface, upon being instantiated, is to allocate a distinct memory space to each VM.

6. The system of claim 5, wherein when a particular VM is to access a particular GPU engine, memory access by the particular GPU engine is restricted to the memory space allocated to the particular VM.

7. The system of claim 1, wherein:
   the microcontroller is configured to schedule execution of a first workload issued by the first VM on the first GPU engine;
   the microcontroller is configured to schedule execution of a second workload issued by the second VM on the second GPU engine; and
   the first workload and the second workload are to be executed concurrently.

8. A method comprising:
   assigning a unique memory space to each of a plurality of virtual machines (VMs) including assigning a first memory space to a first VM and assigning a second memory space to a second VM;
   assigning a first Peripheral Component Interconnect (PCI) device function number to the first VM and a second PCI device function number to the second VM;
   executing first instructions issued by the first VM exclusively on a first graphical processing unit (GPU) engine of a GPU, and executing second instructions issued by the second VM exclusively on a second GPU engine of the GPU, wherein responsive to a first memory access issued by the first VM, memory access by the first GPU engine is restricted to the first memory space, and responsive to a second memory access issued by the second VM, memory access by the second GPU engine is restricted to the second memory space;
   using a first paravirtualized GPU driver (pdriver) for the first VM to send a first GPU state for the first VM from the first VM to a virtualization driver interface (vdriver interface) of a virtual machine manager (VMM), for subsequent utilization by a microcontroller in the GPU;
   using a second pdriver for the second VM to send a second GPU state for the second VM from the second VM to the vdriver interface of the VMM, for subsequent utilization by the microcontroller in the GPU;
   storing in a first memory location the first GPU state, and storing in a second memory location a second GPU state, wherein the first and second GPU states are stored in the first and second memory locations by the vdriver interface of the VMM, wherein the first GPU state comprises a first set of parameter values associated with the first VM, and wherein the second GPU state comprises a second set of parameter values associated with the second VM;

responsive to access enablement of the first VM to the first GPU engine, retrieving the first GPU state from the first memory location and configuring the first GPU engine according to the retrieved first GPU state, wherein the operations of retrieving the first GPU state and configuring the first GPU engine are performed by the microcontroller in the GPU;

responsive to access enablement of the second VM to the second GPU engine, retrieving the second GPU state from the second memory location and configuring the second GPU engine according to the retrieved second GPU state, wherein the operations of retrieving the second GPU state and configuring the second GPU engine are performed by the microcontroller in the GPU; and in preparation for transitioning execution from the first VM to a third VM among the plurality of VMs, saving the first GPU state for the first VM and restoring a third GPU state for the third VM;

wherein the operations of saving the first GPU state for the first VM and restoring the third GPU state for the third VM are performed by the microcontroller in the GPU;

wherein the first GPU engine uses the first PCI device function number to access the first memory space for the first VM; and wherein the second GPU engine uses the second PCI device function number to access the second memory space for the second VM.

9. The method of claim 8, further comprising:
wherein the operation of executing the first instructions issued by the first VM exclusively on the first GPU engine comprises granting exclusive access to the first GPU engine for the first VM when the first VM accesses the first GPU engine.

10. The method of claim 8, further comprising:
scheduling, by the microcontroller in the GPU, execution of the first instructions by the first GPU engine and execution of the second instructions by the second GPU engine.

11. The method of claim 10, wherein the first instructions issued by the first VM are to be executed by the first GPU engine while the second instructions issued by the second VM are to be executed by the second GPU engine.

12. The method of claim 8, further comprising scheduling exclusive access to the GPU by each VM of the plurality of VMs during a respective schedule slot, wherein the scheduling is determined by the microcontroller in the GPU.

13. At least one nontransitory machine readable storage including machine-readable instructions that, when executed by a processor, cause the processor to:
assign a unique memory space to each of a plurality of virtual machines (VMs) including assignment of a first memory space to a first VM and assignment of a second memory space to a second VM;
assign a first Peripheral Component Interconnect (PCI) device function number to the first VM and a second PCI device function number to the second VM;
execute first instructions issued by the first VM exclusively on a first graphical processing unit (GPU) engine of a GPU, and execute second instructions issued by the second VM exclusively on a second GPU engine of the GPU, wherein responsive to a first memory access issued by the first VM, memory access by the first GPU engine is restricted to the first memory space, and responsive to a second memory access issued by the second VM, memory access by the second GPU engine is restricted to the second memory space, wherein the first GPU engine uses the first PCI device function number to access the first memory space for the first VM, and wherein the second GPU engine uses the second PCI device function number to access the second memory space for the second VM;
use a first paravirtualized GPU driver (pdriver) for the first VM to send a first GPU state for the first VM from the first VM to a virtualization driver interface (vdriver interface) of a virtual machine manager (VMM), for subsequent utilization by a microcontroller in the GPU;
use a second pdriver for the second VM to send a second GPU state for the second VM from the second VM to the vdriver interface of the VMM, for subsequent utilization by the microcontroller in the GPU;
store in a first memory location the first GPU state, and storing in second memory location the second GPU state, wherein the first and second GPU states are stored in the first and second memory locations by the vdriver interface of the VMM, the first GPU state comprises a first set of parameter values associated with the first VM, and the second GPU state comprises a second set of parameter values associated with the second VM;
responsive to enablement of the first VM to execute the first instructions on the first GPU engine, retrieve the first GPU state from the first memory location and configure the first GPU engine according to the retrieved first GPU state, wherein the operations of retrieving the first GPU state and configuring the first GPU engine are performed by the microcontroller in the GPU;
responsive to enablement of the second VM to execute the second instructions on the second GPU engine, retrieve the second GPU state from the second memory location and configure the second GPU engine according to the retrieved second GPU state, wherein the operations of retrieving the second GPU state and configuring the second GPU engine are performed by the microcontroller in the GPU; and
in preparation for transitioning execution from the first VM to a third VM among the plurality of VMs, save the first GPU state for the first VM and restore a third GPU state for the third VM, wherein the operations of saving the first GPU state for the first VM and restoring the third GPU state for the third VM are performed by the microcontroller in the GPU.

14. The at least one machine readable storage of claim 13, wherein:
the instructions which, when executed, implement the first and second pdrivers, and
the first and second pdrivers are adapted to provide the first and second GPU states, respectively, to the vdriver interface, prior to storage of the first and second GPU states by the vdriver interface.

15. The at least one machine readable storage of claim 13, further including machine-readable instructions to schedule exclusive access to a respective GPU engine by each of a plurality of VMs during a respective schedule slot, wherein the scheduling is determined by the microcontroller in the GPU.

16. The at least one machine readable storage of claim 13, wherein the first instructions issued by the first VM are to be executed by the first GPU engine while the second instructions issued by the second VM are to be executed by the second GPU engine.

* * * * *